United States Patent
Nakashima et al.

(10) Patent No.: US 7,974,743 B2
(45) Date of Patent: Jul. 5, 2011

(54) TEMPERATURE CONTROLLING APPARATUS, INFORMATION PROCESSING APPARATUS, AND RECORDING MEDIUM

(75) Inventors: Yoshiyasu Nakashima, Kawasaki (JP); Satoshi Kazama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 12/395,782

(22) Filed: Mar. 2, 2009

(65) Prior Publication Data

US 2009/0222147 A1  Sep. 3, 2009

(30) Foreign Application Priority Data

Feb. 29, 2008  (JP) .................. 2008-050301

(51) Int. Cl.
*G05D 23/00* (2006.01)
*G06F 1/00* (2006.01)

(52) U.S. Cl. ........ 700/299; 700/300; 713/322; 713/323; 713/500

(58) Field of Classification Search ........ 700/1, 99–300; 713/300, 322–323, 400, 500–501, 600; 236/82
See application file for complete search history.

(56) References Cited

U.S. PATENT DOCUMENTS

| | | | | |
|---|---|---|---|---|
| 5,010,739 A | * | 4/1991 | Isshiki et al. | 62/158 |
| 5,249,741 A | * | 10/1993 | Bistline et al. | 236/49.3 |
| 6,191,546 B1 | * | 2/2001 | Bausch et al. | 318/471 |
| 6,194,858 B1 | * | 2/2001 | Chen | 318/473 |
| 6,494,381 B2 | * | 12/2002 | Bulthuis | 236/49.3 |
| 6,777,900 B2 | * | 8/2004 | Lee | 318/268 |
| 6,792,489 B2 | * | 9/2004 | Osburn et al. | 710/104 |
| 6,880,093 B1 | * | 4/2005 | Lyles | 713/300 |
| 6,959,258 B2 | * | 10/2005 | Smith et al. | 702/132 |
| 7,577,862 B2 | * | 8/2009 | McClendon et al. | 713/500 |
| 2003/0158697 A1 | * | 8/2003 | Gold et al. | 702/132 |
| 2004/0105664 A1 | * | 6/2004 | Ivankovic | 388/800 |
| 2009/0112506 A1 | * | 4/2009 | Kazama | 702/130 |

FOREIGN PATENT DOCUMENTS

| | | |
|---|---|---|
| JP | 11-237931 | 8/1999 |
| JP | 2004-516672 | 6/2004 |

* cited by examiner

*Primary Examiner* — Ramesh B Patel
(74) *Attorney, Agent, or Firm* — Fujitsu Patent Center

(57) ABSTRACT

A temperature controlling apparatus determines a fan rotation speed from a surrounding noise and a fan noise, measures a temperature of a large scale integration (LSI) device or the like that is a controlled object, determines, in a cooling capacity range of the determined fan rotation speed, an operating clock frequency that falls within an allowable temperature range, and controls the LSI to be connected.

4 Claims, 9 Drawing Sheets

| SURROUNDING NOISE [dBA] | 20 | 30 | 40 |
|---|---|---|---|
| FAN NOISE [dBA] | 10 | 20 | 30 |

| FAN DUTY CYCLE [%] | 0 | 10 | 30 | 40 | 60 | 80 | 100 |
|---|---|---|---|---|---|---|---|
| FAN NOISE [dBA] | 0 | 20 | 23 | 26 | 30 | 35 | 39 |

FIG.8

| | 1 kHz | 1 kHz | ... | 3 kHz | 3 kHz | ... | 5 kHz | 5 kHz | ... | 10 kHz | 10 kHz | ... | 30 kHz | 30 kHz | 21 |
|---|---|---|---|---|---|---|---|---|---|---|---|---|---|---|---|
| SURROUNDING NOISE [dBA] | 35 | 33 | ... | 39 | 36 | ... | 30 | 25 | ... | 25 | 23 | ... | 23 | 21 | ... |
| FAN NOISE [dBA] | 24 | 21 | ... | 29 | 25 | ... | 20 | 15 | ... | 14 | 12 | ... | 13 | 11 | ... |

FIG.9

|  | 1 kHz | ... | 3 kHz | ... | 5 kHz | ... | 10 kHz | ... | 30 kHz | ... |
|---|---|---|---|---|---|---|---|---|---|---|
| SURROUNDING NOISE [dBA] | 35 | ... | 39 | ... | 30 | ... | 25 | ... | 23 | ... |

21

TEMPERATURE CONTROLLING APPARATUS, INFORMATION PROCESSING APPARATUS, AND RECORDING MEDIUM

BACKGROUND OF THE INVENTION

1. Field of the Invention

The present invention relates to a temperature controlling apparatus that includes a fan rotated to prevent a temperature increase at the surface of a casing that is a controlled object that undergoes various types of processing, a temperature control program, and an information processing apparatus.

2. Description of the Related Art

Conventionally, with an improvement in performance of a large scale integration (LSI) device such as a central processing unit (CPU), a memory, a memory controller, and a graphics chip, mounted on information processing apparatuses such as a personal computer (PC), the performance of the information processing apparatuses have also improved considerably. When heat is generated due to an increase in the temperature of the LSI or the surrounding temperature of the LSI, along with the operation of the LSI, the dissipation of heat to suppress heat generation becomes important. The noise generated due to an increased rotation speed of a fan, which is operated to dissipate heat, is also a problem.

A typical process that has been carried out to reduce the noise and the heat generated by the temperature increase will now be explained with reference to FIG. 11. As shown in FIG. 11, a temperature controlling apparatus includes a fan to prevent an increase in temperature at the surface of a casing, generated by the operation of the LSI in the information processing apparatus. If the temperature at the surface of the casing is increased, the temperature controlling apparatus rotates the fan to dissipate the heat and determines an operating clock frequency of the LSI. The determined operating clock frequency affects the operating performance of a process executed in the LSI. If the operating clock frequency of the LSI is reduced, the temperature increase at the surface of the casing is prevented. Accordingly, the noise in question can be reduced, by reducing the rotation speed of the fan. In the description, the temperature increase at the surface of the casing does not only mean the temperature increase at the surface of the casing, but also means the temperature increase in a space of the casing and the LSI and the like used in the apparatus (hereinafter, "temperature increase at the surface of the casing").

Explaining more specifically, the temperature controlling apparatus receives the upper limit of the operating clock frequency and the like of the LSI (for example, a CPU that generates a particularly large amount of heat) determined by a user, and changes to the received operating clock frequency (see (1) in FIG. 11). The temperature controlling apparatus then measures a temperature of the LSI that generates heat (see (2) in FIG. 11), determines a fan rotation speed that corresponds to the measured temperature, and changes the rotation speed of the fan (see (3) in FIG. 11). In other words, the temperature controlling apparatus determines the rotation speed of the fan, based on the processing performance of the LSI with the operating clock frequency determined by the user. FIG. 11 is a schematic for explaining a process performed by the conventional temperature controlling apparatus.

In Japanese Patent Application Laid-open No. H11-237931, an information processing apparatus, if the detected temperature in a main body exceeds a predetermined setting value, detects the surrounding noise. The information processing apparatus, if the surrounding noise is equal to or more than the setting value, rotates the fan, and if the surrounding noise is equal to or less than the predetermined setting value, temporarily stops the operating clock frequency. In other words, the information processing apparatus, if the surrounding noise is large, reduces the heat by rotating the fan, because the noise generated by the fan causes a little influence. The information processing apparatus, if the surrounding noise is small, reduces the heat by lowering the performance of the LSI without rotating the fan, because the noise generated by the fan causes a large influence.

In JP-T-2004-516672, if the detected temperature in the main body exceeds the setting value, an audio apparatus measures the output sound and the surrounding noise of the audio apparatus. The audio apparatus, if the temperature and the noise are equal to or more than a predetermined threshold, rotates the fan, and if the temperature and the noise are less than the predetermined threshold, does not rotate the fan. In other words, if the temperature is increased, the audio apparatus reduces heat by rotating the fan, only when the noise of the surroundings and the audio apparatus are large.

However, in the conventional technology as described above, the operating clock frequency of the LSI is excessively reduced, thereby degrading the processing performance of the LSI unnecessarily. Therefore, degradation in performance occurs, for example the LSI that is a controlled object requires a long execution time for the processing.

More specifically, the setting of the operating clock frequency made by the user is not directly related to the noise generated by the rotation of the fan. Accordingly, the performance required for executing the process cannot be satisfied sometimes. The operating clock frequency determined by the user, if not readjusted by the user when the surrounding noise has changed, may be suppressing the LSI operation excessively.

In the Japanese Patent Application Laid-open No. H11-237931 and the JP-T-2004-516672, if the temperature is equal to or higher than a predetermined value, the fan is rotated or stopped, or the performance of the LSI is lowered, depending on the surrounding noise. Accordingly, the fan rotation and the suppression of the LSI operation are off balance, thereby suppressing the operation of the LSI excessively, and degrading the processing performance unnecessarily. As a result, the performance required for executing the process cannot be satisfied.

SUMMARY

It is an object of the present invention to at least partially solve the problems in the conventional technology.

A temperature controlling apparatus according to one aspect of the present invention controls a fan rotation speed of a fan rotated to prevent a temperature increase at a surface of a casing that is a controlled object that undergoes various types of processing, and an operating clock frequency that indicates a value of operating performance required for operating the controlled object that undergoes the various types of processing, and the temperature controlling apparatus includes a first storage unit that correspondingly stores therein a surrounding noise that indicates volume of noise in a surrounding environment of the temperature controlling apparatus, a fan noise that indicates volume of noise generated by a rotation of the fan determined based on the surrounding noise, and a fan rotation speed that indicates a rotation speed of the fan based on the fan noise, a second storage unit that correspondingly stores therein a first temperature that is a temperature in one of the casing and a surrounding or both of the temperature controlling apparatus, a fan rotation speed that indicates the rotation speed of the fan required for dissipating heat generated by an increase in the first temperature, and the operating clock frequency that indicates the value of the operating performance, a fan rotation speed determining unit that measures the surrounding noise at a predetermined period of time, acquires a fan noise that corresponds to the measured surrounding noise from the first storage unit, acquires a fan rotation speed that corresponds to the acquired fan noise from the first storage unit, and determines the acquired fan rotation speed as a fan rotation speed based on the measured surrounding noise, a temperature comparing unit that measures, if the fan rotation speed determining unit determines the fan rotation speed, the first temperature, acquires a second temperature that is a temperature that corresponds to the fan rotation speed determined by the fan rotation speed determining unit from the second storage unit, and compares the measured first temperature and the acquired second temperature, and an operating clock frequency determining unit, if the temperature comparing unit determines that the first temperature is equal to or more than the second temperature, that acquires an operating clock frequency that corresponds to the acquired second temperature from the second storage unit, controls the controlled object by using the acquired operating clock frequency, and controls the fan by using the fan rotation speed determined by the fan rotation speed determining unit, and if the temperature comparing unit determines that the first temperature is less than the second temperature, that acquires an operating clock frequency and a fan rotation speed that correspond to the measured first temperature from the second storage unit, controls the fan by using the acquired fan rotation speed, and controls the controlled object by using the acquired operating clock frequency.

An information processing apparatus according to another aspect of the present invention includes an LSI that undergoes various types of processing, a fan that is rotated to prevent a temperature increase at a surface of a casing of the LSI, and a temperature controlling apparatus that controls a fan rotation speed of the fan, and an operating clock frequency that indicates a value of operating performance required for operating the LSI, and the temperature controlling apparatus includes a first storage unit that correspondingly stores therein a surrounding noise that indicates volume of noise in a surrounding environment of the temperature controlling apparatus, a fan noise that indicates volume of noise generated by a rotation of the fan determined based on the surrounding noise, and a fan rotation speed that indicates a rotation speed of the fan based on the fan noise, a second storage unit that correspondingly stores therein a first temperature that is a temperature in one of the casing and a surrounding or both of the temperature controlling apparatus, a fan rotation speed that indicates the rotation speed of the fan required for dissipating heat generated by an increase in the first temperature, and the operating clock frequency that indicates the value of the operating performance, a fan rotation speed determining unit that measures the surrounding noise at a predetermined period of time, acquires a fan noise that corresponds to the measured surrounding noise from the first storage unit, acquires a fan rotation speed that corresponds to the acquired fan noise from the first storage unit, and determines the acquired fan rotation speed as a fan rotation speed based on the measured surrounding noise, a temperature comparing unit that measures, if the fan rotation speed determining unit determines the fan rotation speed, the first temperature, acquires a second temperature that is a temperature that corresponds to the fan rotation speed determined by the fan rotation speed determining unit from the second storage unit, and compares the measured first temperature and the acquired second temperature, and an operating clock frequency determining unit, if the temperature comparing unit determines that the first temperature is equal to or more than the second temperature, that acquires an operating clock frequency that corresponds to the acquired second temperature from the second storage unit, controls the controlled object by using the acquired operating clock frequency, and controls the fan by using the fan rotation speed determined by the fan rotation speed determining unit, and if the temperature comparing unit determines that the first temperature is less than the second temperature, that acquires an operating clock frequency and a fan rotation speed that correspond to the measured first temperature from the second storage unit, controls the fan by using the acquired fan rotation speed, and controls the controlled object by using the acquired operating clock frequency.

A computer-readable recording medium according to another aspect of the present invention stores therein a computer program for controlling a fan rotation speed of a fan rotated to prevent a temperature increase at a surface of a casing that is a controlled object that undergoes various types of processing, and an operating clock frequency that indicates a value of operating performance required for operating the controlled object, the computer program causing a computer which works as a temperature controlling apparatus to execute firstly storing correspondingly a surrounding noise that indicates volume of noise in a surrounding environment of the temperature controlling apparatus, a fan noise that indicates volume of noise generated by a rotation of the fan determined based on the surrounding noise, and a fan rotation speed that indicates a rotation speed of the fan based on the fan noise, secondly storing correspondingly a first temperature that is a temperature in one of the casing and a surrounding or both of the temperature controlling apparatus, a fan rotation speed that indicates the rotation speed of the fan required for dissipating heat generated by an increase in the first temperature, and the operating clock frequency that indicates the value of the operating performance, determining the fan rotation speed by measuring the surrounding noise at a predetermined period of time, acquiring a fan noise that corresponds to the measured surrounding noise from information stored at the firstly storing, acquiring a fan rotation speed that corresponds to the acquired fan noise from the information stored at the firstly storing, and determining the acquired fan rotation speed as the fan rotation speed based on the measured surrounding noise, comparing the first temperature and a second temperature by measuring, if the fan rotation speed is determined at the determining, the first temperature, acquiring the second temperature that is a temperature that corresponds to the fan rotation speed determined at the determining from information stored at the secondly storing, and comparing the measured first temperature and the acquired second temperature, and determining the operating clock frequency, if the first temperature is determined to be equal to or more than the second temperature at the comparing, by acquiring an operating clock frequency that corresponds to the acquired second temperature from information stored at the secondly storing, controlling the controlled object by using the acquired operating clock frequency, and controlling the fan by using the fan rotation speed determined at the determining, and if the first temperature is determined to be less than the second temperature at the comparing, by acquiring an operating clock frequency and a fan rotation speed that correspond to the measured first temperature from the information stored at the secondly storing, controlling the fan by using the acquired fan rotation speed, and controlling the controlled object by using the acquired operating clock frequency.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic diagram of an example of a surrounding noise/fan noise table according to a second embodiment of the present invention;

FIG. 9 is a schematic diagram of an example of a surrounding noise/fan noise table according to a third embodiment of the present invention;

DETAILED DESCRIPTION OF THE PREFERRED EMBODIMENTS

Exemplary embodiments of a temperature controlling apparatus according to the present invention are described below in greater detail with reference to the accompanying drawings. An outline and characteristics, and a configuration and a processing flow of the temperature controlling apparatus according to the present invention are sequentially described below, and advantages of the present embodiment are described in the end.

Outline and Characteristics

Figure 1:
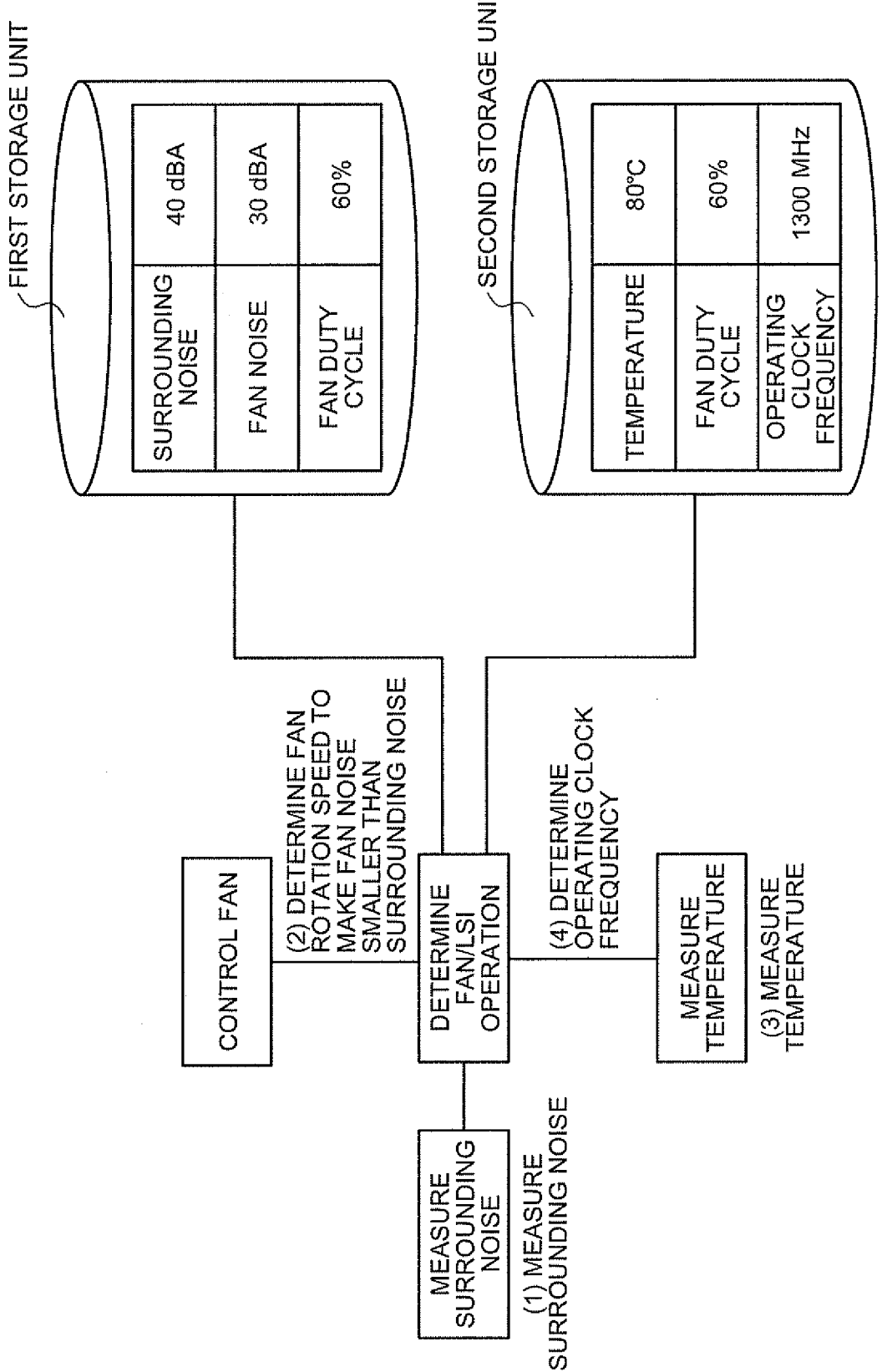
FIG. 1 is a schematic for explaining an outline and characteristics of a temperature controlling apparatus according to a first embodiment of the present invention.

An outline and characteristics of a temperature controlling apparatus according to a first embodiment of the present invention will be described with reference to FIG. 1. FIG. 1 is a schematic for explaining an outline and characteristics of the temperature controlling apparatus according to the first embodiment.

The temperature controlling apparatus is one of LSIs mounted on a microcomputer that is one or a plurality of integrated circuits that monitors a power supply system (such as battery) of an information processing apparatus such as a PC. The temperature controlling apparatus is connected to a CPU and the like that is one of the other LSIs that controls the information processing apparatus. The temperature controlling apparatus, in particular, controls a fan that dissipates heat generated in the LSI (for example, CPU that generates a particularly large amount of heat) mounted on the information processing apparatus. The amount of heat generated in the information processing apparatus is increased, along with an increase of an operating clock frequency that indicates a value of operating performance of the LSI to be mounted. The operating clock frequency is reduced by rotating a fan and dissipating the generated heat. However, the more the fan is rotated, the louder the noise generated by the rotation of the fan becomes. In other words, if the temperature of a casing is high, the rotation speed of the fan is increased. However, if the operating clock frequency is reduced, the temperature increase in the casing is prevented, because the rotation speed of the fan is reduced. Accordingly, the noise generated by the rotation of the fan is reduced.

With such a configuration, the outline of the temperature controlling apparatus is to include a fan rotated to prevent the temperature increase at the surface of a casing that is a controlled object that undergoes various types of processing. In particular, the temperature controlling apparatus has the main characteristic of being capable of preventing the processing performance of the LSI to be connected, from being degraded unnecessarily.

Explaining the main characteristic more specifically, the temperature controlling apparatus correspondingly stores therein a surrounding noise that indicates the volume of noise in a surrounding environment of the temperature controlling apparatus, a fan noise that indicates the volume of noise generated by the rotation of a fan determined based on the surrounding noise, and a fan rotation speed that indicates the rotation speed of the fan based on the fan noise. For example, as shown in FIG. 1, the temperature controlling apparatus correspondingly stores therein a surrounding noise of "40 dBA", a fan noise of "30 dBA", a fan duty cycle at "60%", and the like.

The temperature controlling apparatus also correspondingly stores therein a first temperature that is a temperature in the casing and/or the surroundings of the temperature controlling apparatus, a fan rotation speed that indicates the rotation speed of the fan required for dissipating the heat generated by an increase in the first temperature, and an operating clock frequency that indicates a value of the operating performance required for operating a controlled object, which executes various types of processing. For example, as shown in FIG. 1, the temperature controlling apparatus correspondingly stores therein a temperature of "80 degrees centigrade", a fan duty cycle at "60%", and an operating clock frequency of "1300 megahertz". The fan noise determined based on the surrounding noise should be smaller than the surrounding noise, so as the noise generated by the rotation of the fan does not make the user uncomfortable.

In such a condition, the temperature controlling apparatus measures the surrounding noise at a predetermined period of time (see (1) in FIG. 1), and acquires a fan noise that corresponds to the measured surrounding noise from a first predetermined storage unit. The temperature controlling apparatus then acquires a fan rotation speed that corresponds to the acquired fan noise from the first predetermined storage unit, and determines the acquired fan rotation speed as a fan rotation speed based on the measured surrounding noise (see (2) in FIG. 1).

Explaining more specifically, the temperature controlling apparatus measures a surrounding noise of "40 dBA" at a predetermined period of time (such as 10 minutes and 20 minutes) determined in advance by the user. The temperature controlling apparatus then acquires a fan noise of "30 dBA"

that corresponds to the measured surrounding noise of "40 dBA" from the first storage unit. The temperature controlling apparatus then acquires a fan rotation speed (in FIG. 1, referred to as a fan duty cycle that is a ratio of the fan rotation speed) at "60%" that corresponds to the acquired fan noise of "30 dBA" from the first storage unit. Then, the temperature controlling apparatus determines the acquired fan rotation speed at "60%" as a fan rotation speed that corresponds to the measured surrounding noise of "40 dBA".

If the fan rotation speed is determined, the temperature controlling apparatus measures the first temperature, acquires a second temperature that is the temperature that corresponds to the determined fan rotation speed from a second predetermined storage unit, and compares the measured first temperature and the acquired second temperature (see (3) in FIG. 1).

Explaining more specifically, if the fan rotation speed is determined at "60%", the temperature controlling apparatus measures a temperature such as "90 degrees centigrade" or "70 degrees centigrade", in the casing and/or the surroundings of the temperature controlling apparatus. The temperature controlling apparatus then acquires a temperature of "80 degrees centigrade" that corresponds to the determined fan rotation speed at "60%" from the second storage unit, and compares the acquired temperature of "80 degrees centigrade" with the measured temperature of the "90 degrees centigrade", the "70 degrees centigrade", or the like.

If the first temperature is equal to or more than the second temperature, the temperature controlling apparatus acquires an operating clock frequency that corresponds to the acquired second temperature from the predetermined second storage unit, controls the acquired operating clock frequency as an operating clock frequency that indicates a value of the operating performance, and controls the fan rotation speed of the determined fan. If the first temperature is less than the second temperature, the temperature controlling apparatus acquires an operating clock frequency and a fan rotation speed that correspond to the measured first temperature from the predetermined second storage unit, controls the acquired fan rotation speed as a new fan rotation speed, and controls the acquired operating clock frequency as an operating clock frequency that indicates a value of the operating performance (see (4) in FIG. 1).

Explaining more specifically, if the measured temperature of "90 degrees centigrade" is equal to or more than the acquired temperature of "80 degrees centigrade", the temperature controlling apparatus determines an operating clock frequency of "1300 megahertz" that corresponds to the acquired temperature of "80 degrees centigrade" as an operating clock frequency that indicates a value of the operating performance required for operating the controlled object, which executes various types of processing. The temperature controlling apparatus also sets the determined operating clock frequency of "1300 megahertz" in the LSI to be connected, and controls the fan rotation speed of the determined fan.

If the measured temperature of "70 degrees centigrade" is less than the acquired temperature of "80 degrees centigrade", the temperature controlling apparatus acquires an operating clock frequency of "1100 megahertz" and a fan rotation speed at "40%" that correspond to the measured temperature of "70 degrees centigrade", from the second storage unit. The temperature controlling apparatus then determines and controls the acquired fan rotation speed at "40%" as a new fan rotation speed, and determines the acquired operating clock frequency of "1100 megahertz" as an operating clock frequency that indicates a value of the operating performance required for operating the controlled object, which executes various types of processing. The temperature controlling apparatus then sets the determined operating clock frequency of "1100 megahertz" in the LSI to be connected.

In this manner, the temperature controlling apparatus according to the first embodiment, when a fan rotated to prevent a temperature increase at the surface of the casing, which is the controlled object that undergoes various types of processing, is included therein, determines a fan rotation speed that corresponds to a surrounding noise and a fan noise smaller than the surrounding noise, and measures the temperature of the casing and/or the surroundings, thereby determining an operating clock frequency that falls within an allowable temperature range. Accordingly, it is possible to prevent the processing performance of the LSI to be connected from being degraded unnecessarily, and/or prevent the noise generated by the rotation of the fan.

In other words, the temperature controlling apparatus, when the fan is rotated to prevent a temperature increase at the surface of the casing, which is the controlled object that undergoes various types of processing, determines the rotation speed of the fan within a range of volume smaller than the surrounding noise. Subsequently, the temperature controlling apparatus, within a range equal to or less than the rotation speed of the determined fan, determines the operating clock frequency that can correspond to the temperature of the casing and/or the surroundings. As a result, compared with the related art in which the LSI operation is excessively suppressed, because the fan rotation and the suppression of the LSI operation are off balance, it is possible to prevent the processing performance of the LSI to be connected from being degraded unnecessarily and/or prevent the noise generated by the rotation of the fan.

Figure 2:
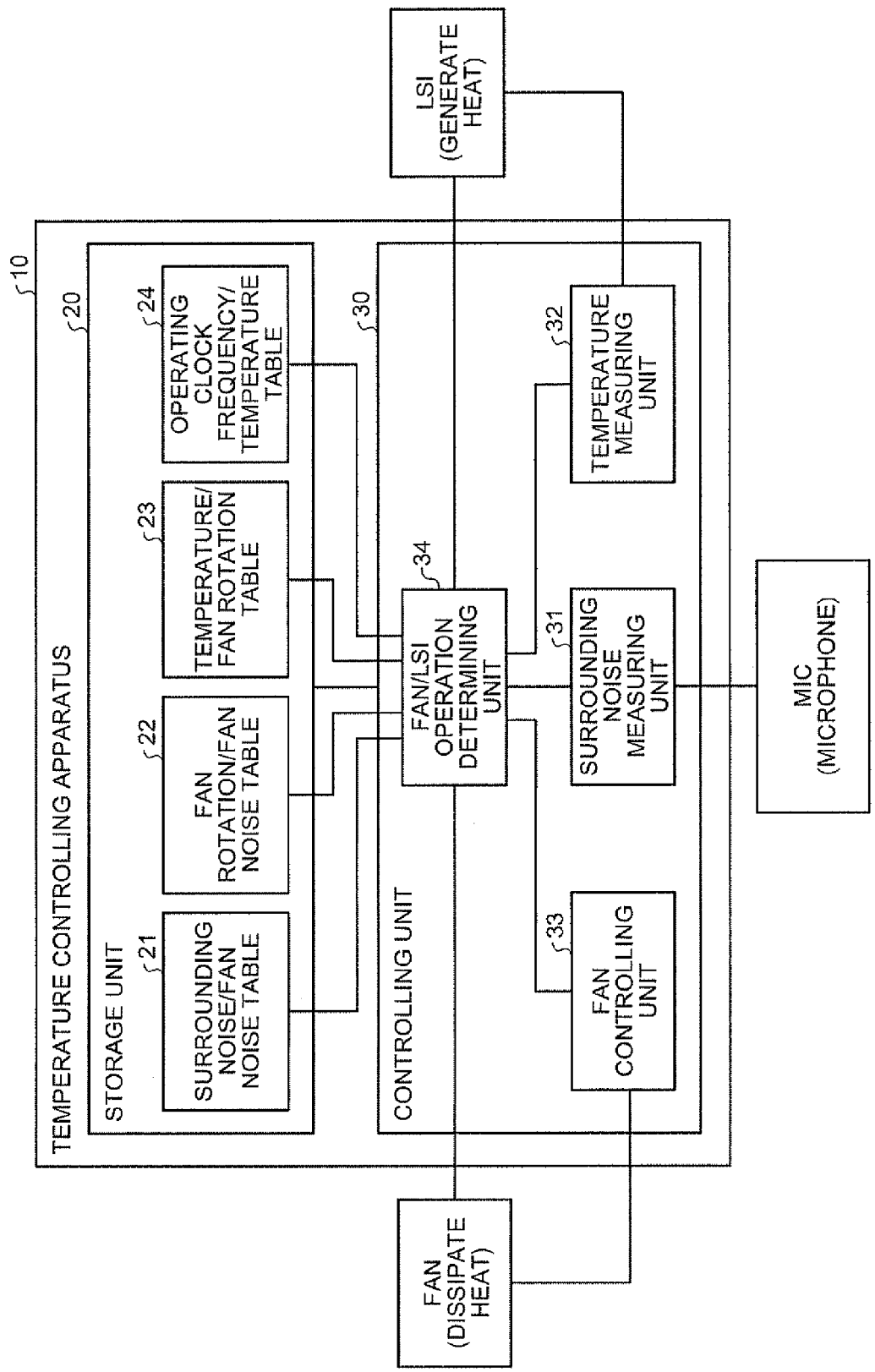
FIG. 2 is a schematic diagram of a configuration of the temperature controlling apparatus according to the first embodiment.

Configuration of Temperature Controlling Apparatus According to the First Embodiment A configuration of the temperature controlling apparatus according to the first embodiment will now be explained with reference to FIG. 2. FIG. 2 is a schematic diagram of the configuration of the temperature controlling apparatus according to the first embodiment.

As shown in FIG. 2, a temperature controlling apparatus 10 includes a storage unit 20 and a controlling unit 30. The temperature controlling apparatus 10 is one of LSIs mounted on a microcomputer that is one or a plurality of integrated circuits that monitors a power supply system of an information processing apparatus such as a PC. The temperature controlling apparatus 10 is connected to a CPU and the like that is one of the other LSIs that controls the information processing apparatus.

The storage unit 20 stores therein data required for various types of processing performed by the controlling unit 30 and various processing results obtained by the controlling unit 30. The storage unit 20 includes, as those closely related to the present invention, a surrounding noise/fan noise table 21, a fan rotation/fan noise table 22, a temperature/fan rotation table 23, and an operating clock frequency/temperature table 24.

Figures 3, 4:
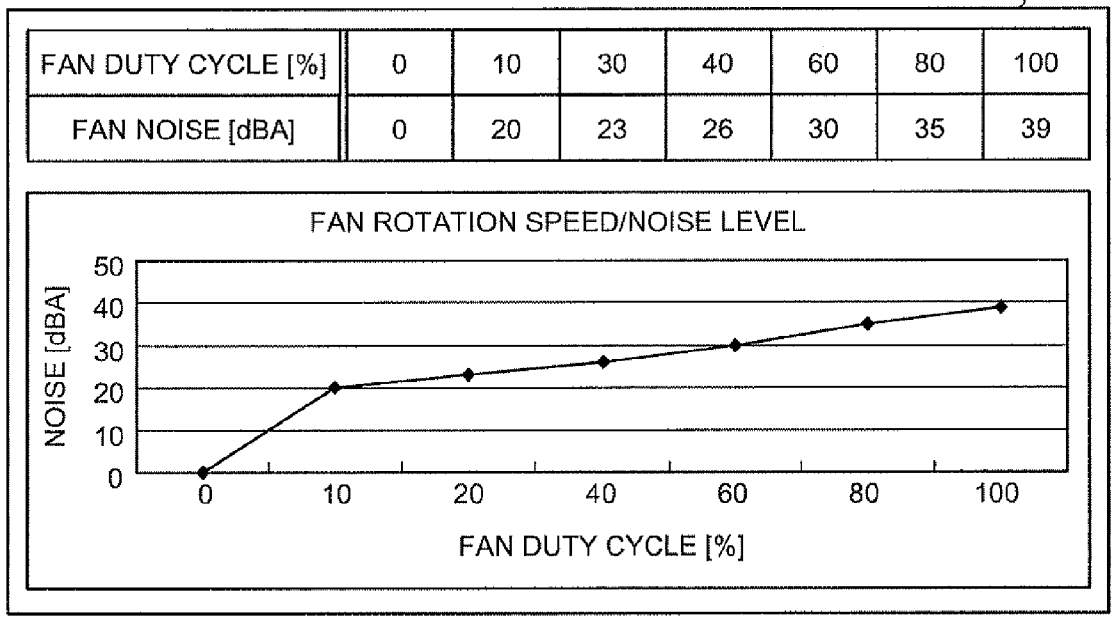
FIG. 3 is a schematic diagram of an example of a surrounding noise/fan noise table according to the first embodiment.
FIG. 4 is a schematic diagram of an example of a fan rotation/fan noise table according to the first embodiment.

The surrounding noise/fan noise table 21 stores therein a surrounding noise that indicates the volume of noise in the surrounding environment of the temperature controlling apparatus 10, and a fan noise that indicates the volume of noise generated by the rotation of the fan determined based on the surrounding noise. For example, as shown in FIG. 3, the surrounding noise/fan noise table 21 correspondingly stores therein a surrounding noise such as "20 dBA", "30 dBA", and "40 dBA" that indicates the volume (dBA) of noise in the surrounding environment of the temperature controlling apparatus 10, and a fan noise such as "10 dBA", "20 dBA", and "30 dBA" that indicates the volume (dBA) of noise generated by the rotation of the fan determined based on the surrounding noise. The fan noise determined based on the surrounding noise is a value smaller than the surrounding noise, so as not to make the user uncomfortable. FIG. 3 is a schematic diagram of an example of the surrounding noise/fan noise table 21 according to the first embodiment.

The fan rotation/fan noise table 22 correspondingly stores therein a fan rotation speed that indicates the rotation speed of a fan, and a fan noise that indicates the volume of noise generated by the rotation of the fan. For example, as shown in FIG. 4, the fan rotation/fan noise table 22 correspondingly stores therein a fan duty cycle such as "0%", "10%", and "30%" that is a ratio (%) of a rotation speed of a fan that indicates the rotation speed of the fan, and a fan noise such as "0 dBA", "20 dBA", and "23 dBA" that indicates the volume of noise generated by the rotation of the fan. FIG. 4 is a schematic diagram of an example of the fan rotation/fan noise table 22 according to the first embodiment.

Figure 5:
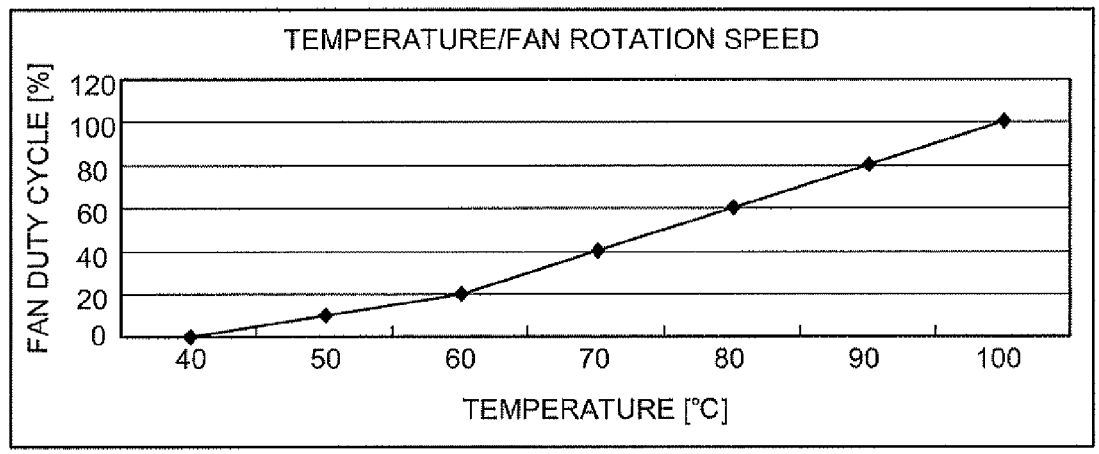
FIG. 5 is a schematic diagram of an example of a temperature/fan rotation table according to the first embodiment.

The temperature/fan rotation table 23 correspondingly stores therein a temperature in the casing and/or the surroundings of the temperature controlling apparatus 10 and a fan rotation speed that indicates the rotation speed of a fan required for dissipating the heat generated due to an increase in temperature. For example, as shown in FIG. 5, the temperature/fan rotation table 23 correspondingly stores therein a temperature such as "40 degrees centigrade", "50 degrees centigrade", and "60 degrees centigrade" in the casing and/or the surroundings of the temperature controlling apparatus 10, and a fan duty cycle such as "0%", "10%", and "20%" that is a ratio of the rotation speed of a fan required for dissipating the heat generated due to an increase in temperature. FIG. 5 is a schematic diagram of an example of the temperature/fan rotation table 23 according to the first embodiment.

Figure 6:
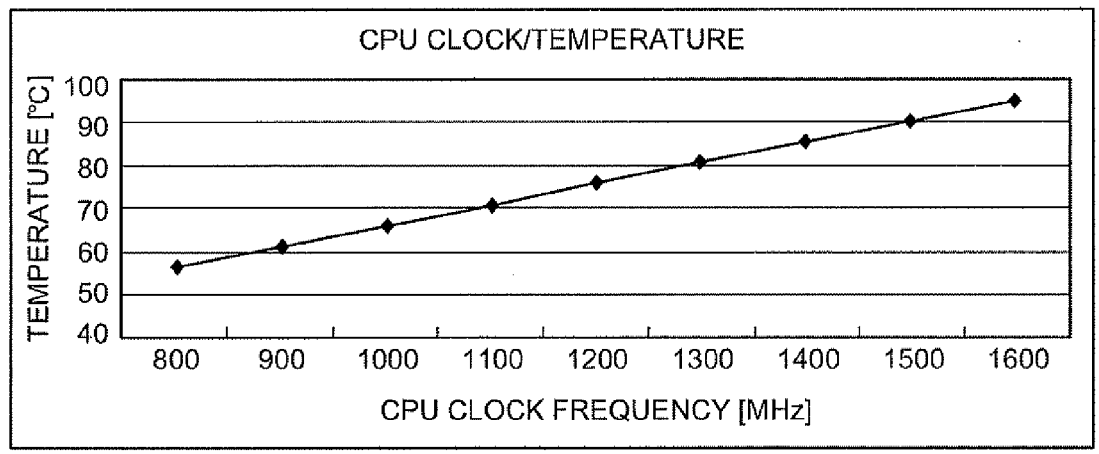
FIG. 6 is a schematic diagram of an example an operating clock frequency/temperature table according to the first embodiment.

The operating clock frequency/temperature table 24 correspondingly stores therein an operating clock frequency that indicates a value of the operating performance required for operating the controlled object, which executes various types of processing, and a temperature in the casing when operated at the value of the operating clock frequency. For example, as shown in FIG. 6, the operating clock frequency/temperature table 24 correspondingly stores therein an operating clock frequency such as "800 megahertz", "900 megahertz", and "1000 megahertz" that indicates a value of the operating performance required for operating the controlled object, which executes various types of processing, and a temperature in the casing such as "55 degrees centigrade", "60 degrees centigrade", and "65 degrees centigrade", when operated at the value of the operating clock frequency. FIG. 6 is a schematic diagram of an example of the operating clock frequency/temperature table 24 according to the first embodiment.

The controlling unit 30 includes an internal memory that stores therein a control program, a computer program that specifies various processing procedures and the like, and required data. The controlling unit 30 includes, as those closely related to the present invention, a surrounding noise measuring unit 31, a temperature measuring unit 32, a fan controlling unit 33, and a fan/LSI operation determining unit 34, and executes various types of processing using thereof.

The surrounding noise measuring unit 31 measures a surrounding noise at a predetermined period of time. Explaining more specifically, the surrounding noise measuring unit 31 measures the surrounding noise of "40 dBA" at a predetermined period of time (for example, 10 minutes and 20 minutes) determined in advance by the user, and notifies to the fan/LSI operation determining unit 34.

The temperature measuring unit 32 measures a temperature in the casing and/or the surroundings of the temperature controlling apparatus 10. Explaining more specifically, the temperature measuring unit 32 measures the temperature of "90 degrees centigrade", "70 degrees centigrade", or the like in the casing and/or the surroundings of the temperature controlling apparatus 10, and notifies to the fan/LSI operation determining unit 34.

The fan controlling unit 33 controls a fan based on a fan rotation speed determined by the fan/LSI operation determining unit 34. Explaining more specifically, the fan controlling unit 33 controls the rotation of the fan at the ratio of the fan performance of "60%", based on the fan duty cycle at "60%", which is a ratio of the fan rotation speed determined by the fan/LSI operation determining unit 34.

The fan/LSI operation determining unit 34 acquires a fan noise that corresponds to the surrounding noise notified by the surrounding noise measuring unit 31 from the surrounding noise/fan noise table 21, acquires a fan rotation speed that corresponds to the acquired fan noise from the fan rotation/fan noise table 22, and determines the acquired fan rotation speed as a fan rotation speed based on the surrounding noise notified by the surrounding noise measuring unit 31.

Explaining more specifically, the fan/LSI operation determining unit 34 acquires a fan noise of "30 dBA" that corresponds to the surrounding noise of "40 dBA" notified by the surrounding noise measuring unit 31, from the surrounding noise/fan noise table 21. The fan/LSI operation determining unit 34 then acquires a fan duty cycle at "60%" that indicates a ratio of the fan rotation speed that corresponds to the acquired fan noise of "30 dBA", from the fan rotation/fan noise table 22. Subsequently, the fan/LSI operation determining unit 34 determines the acquired fan duty cycle at "60%" as a fan duty cycle of the fan rotation speed that corresponds to the surrounding noise of "40 dBA" notified by the surrounding noise measuring unit 31.

The fan/LSI operation determining unit 34, if the fan rotation speed is determined, receives a temperature measured by the temperature measuring unit 32. The fan/LSI operation determining unit 34, then acquires a temperature that corresponds to the determined fan rotation speed from the temperature/fan rotation table 23, and compares the temperature measured by the temperature measuring unit 32 and the acquired temperature.

Explaining more specifically, the fan/LSI operation determining unit 34, if the fan duty cycle at "60%" of the fan rotation speed is determined, receives the temperature of "90 degrees centigrade", "70 degrees centigrade", or the like measured by the temperature measuring unit 32. Then, the fan/LSI operation determining unit 34 acquires a temperature of "80 degrees centigrade" that corresponds to the fan duty cycle at "60%" of the determined fan rotation speed, from the temperature/fan rotation table 23. Subsequently, the fan/LSI operation determining unit 34 compares the temperature of "90 degrees centigrade", "70 degrees centigrade", or the like measured by the temperature measuring unit 32, and the acquired temperature of "80 degrees centigrade".

The fan/LSI operation determining unit 34, if the temperature measured by the temperature measuring unit 32 is equal to or more than the acquired temperature, acquires an operating clock frequency that corresponds to the acquired temperature, from the operating clock frequency/temperature table 24. Then, the fan/LSI operation determining unit 34 controls the acquired operating clock frequency as an operating clock frequency that indicates a value of the operating performance required for operating the controlled object, which executes various types of processing. The fan/LSI operation determining unit 34 also controls the fan rotation speed of the determined fan, and if the temperature measured by the temperature measuring unit 32 is less than the acquired temperature, acquires an operating clock frequency and a fan rotation speed that correspond to the measured temperature, from the operating clock frequency/temperature table 24 and the temperature/fan rotation table 23. Accordingly, the fan/LSI operation determining unit 34 controls the fan rotation speed by determining the acquired fan rotation speed as a new fan rotation speed. The fan/LSI operation determining unit 34 determines and controls the acquired operating clock frequency as an operating clock frequency that indicates a value of the operating performance required for operating the controlled object, which executes various types of processing.

Explaining more specifically, the fan/LSI operation determining unit 34, if the temperature of "90 degrees centigrade" measured by the temperature measuring unit 32 is equal to or more than the acquired temperature of "80 degrees centigrade", acquires an operating clock frequency of "1300 megahertz" that corresponds to the acquired temperature of "80 degrees centigrade", from the operating clock frequency/temperature table 25. The fan/LSI operation determining unit 34 then determines the acquired operating clock frequency of "1300 megahertz" as an operating clock frequency that indicates a value of the operating performance required for operating the controlled object, which executes various types of processing. The fan/LSI operation determining unit 34 then sets the determined operating clock frequency of "1300 megahertz" in the LSI to be connected, and notifies the fan duty cycle at "60%" of the determined fan with respect to the fan controlling unit 33.

The fan/LSI operation determining unit 34, if the temperature of "70 degrees centigrade" measured by the temperature measuring unit 32 is less than the acquired temperature of "80 degrees centigrade", acquires an operating clock frequency of "1100 megahertz" that corresponds to the measured temperature of "70 degrees centigrade" and a fan duty cycle at "40%" that is the ratio of the fan rotation speed, from the operating clock frequency/temperature table 24 and the temperature/fan rotation table 23. The fan/LSI operation determining unit 34 then determines the acquired fan duty cycle at "40%" as a new fan rotation speed, and notifies to the fan controlling unit 33. The fan/LSI operation determining unit 34 also determines the acquired operating clock frequency of "1100 megahertz" as an operating clock frequency that indicates a value of the operating performance required for operating the controlled object, which executes various types of processing, and sets the determined operating clock frequency of "1100 megahertz" in the LSI to be connected.

Temperature Control Process According to First Embodiment

Figure 7:
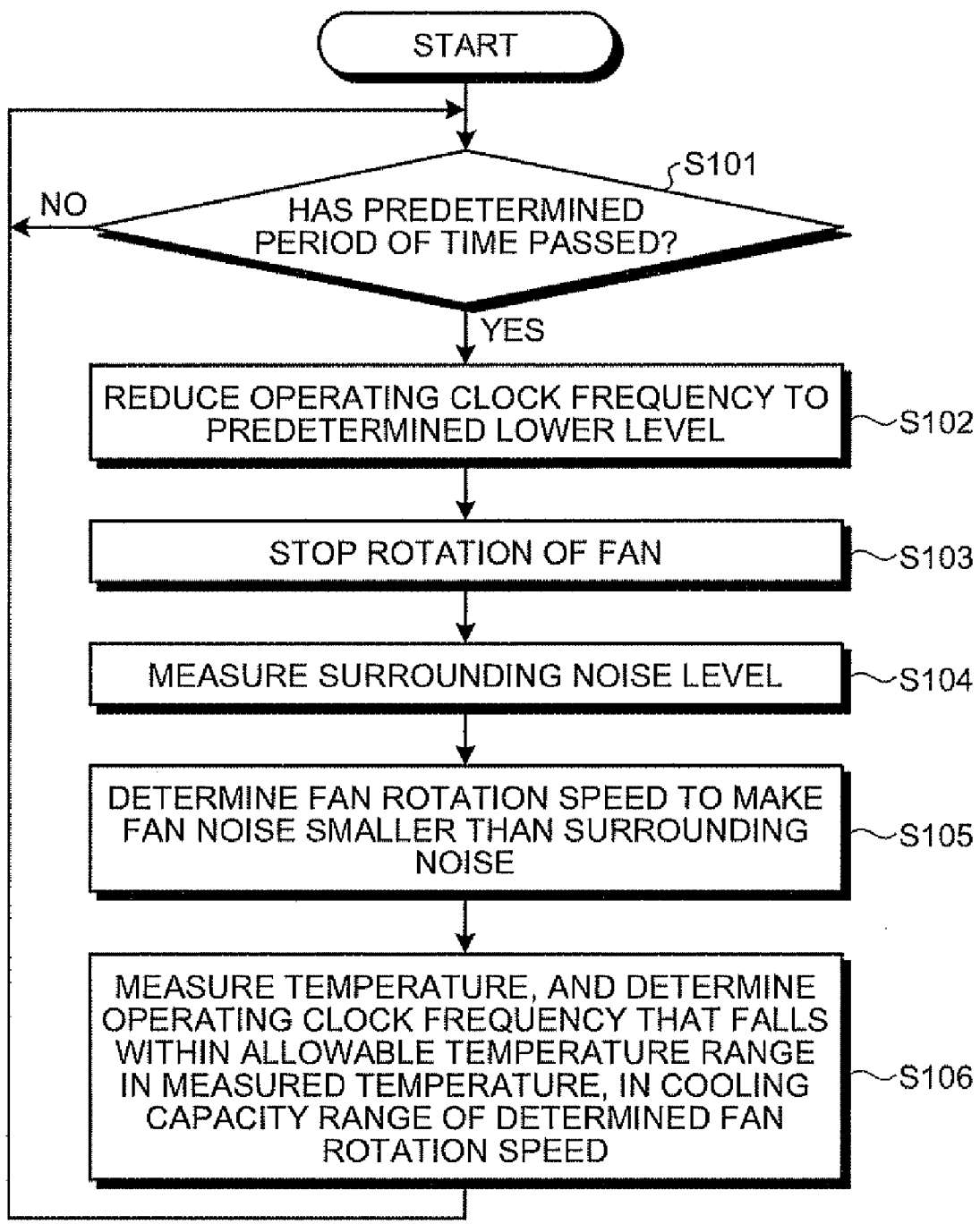
FIG. 7 is a flowchart for explaining a temperature control process performed by the temperature controlling apparatus according to the first embodiment shown in FIG. 2.

A temperature control process performed by the temperature controlling apparatus 10 according to the first embodiment will now be explained with reference to FIG. 7. FIG. 7 is a flowchart for explaining a temperature control process performed by the temperature controlling apparatus 10 according to the first embodiment.

As shown in FIG. 7, the temperature controlling apparatus 10, if a predetermined period of time such as every 10 minutes or every 20 minutes determined in advance by the user has passed (Yes at step S101), reduces the previously set operating clock frequency to a predetermined lower level (step S102), and stops the rotation of the fan (step S103).

The temperature controlling apparatus 10 measures a surrounding noise of "40 dBA" (step S104). The temperature controlling apparatus 10 then acquires a fan noise of "30 dBA" that corresponds to the measured surrounding noise of "40 dBA" from the surrounding noise/fan noise table 21, acquires a fan duty cycle at "60%" that corresponds to the acquired fan noise of "30 dBA" from the fan rotation/fan noise table 22, and determines the fan duty cycle as a fan duty cycle that corresponds to the surrounding noise of "40 dBA" (step S105).

The temperature controlling apparatus 10, if the fan duty cycle at "60%" is determined, measures the temperature of "90 degrees centigrade", "70 degrees centigrade", or the like, in the casing and/or the surroundings and acquires a temperature of "80 degrees centigrade" that corresponds to the determined fan duty cycle at "60%" from the temperature/fan rotation table 23. Subsequently, the temperature controlling apparatus 10 compares the measured temperature of "90 degrees centigrade", "70 degrees centigrade", or the like, with the acquired temperature of "80 degrees centigrade".

The temperature controlling apparatus 10, if the measured temperature of "90 degrees centigrade" is equal to or more than the acquired temperature of "80 degrees centigrade", acquires an operating clock frequency of "1300 megahertz" that corresponds to the acquired temperature of "80 degrees centigrade" from the operating clock frequency/temperature table 24, and determines the operating clock frequency of "1300 megahertz" as an operating clock frequency set in the LSI to be connected (step S106).

The temperature controlling apparatus 10, if the measured temperature of "70 degrees centigrade" is less than the acquired temperature of "80 degrees centigrade", acquires a fan duty cycle at "40%" and an operating clock frequency of "1100 megahertz" that correspond to the measured temperature of "70 degrees centigrade", from the temperature/fan rotation table 23 and the operating clock frequency/temperature table 24. The temperature controlling apparatus 10 then determines the fan duty cycle at "40%" as a new fan duty cycle related to the fan control, and determines the operating clock frequency of "1100 megahertz" as an operating clock frequency set in the LSI to be connected (step S106). The temperature controlling apparatus 10 sets the determined fan duty cycle and the operating clock frequency in the fan and the LSI.

Advantages of First Embodiment

In this manner, according to the first embodiment, if the fan rotated to prevent a temperature increase at the surface of the casing, which is the controlled object that undergoes various types of processing, is included, the temperature controlling apparatus 10 determines the fan rotation speed that corresponds to the fan noise smaller than the surrounding noise. The temperature controlling apparatus 10 then determines the operating clock frequency that corresponds to the measured temperature, in a cooling capacity range of the determined fan rotation speed, and sets the determined operating clock frequency in the LSI to be connected. Accordingly, it is possible to prevent the processing performance of the LSI to be connected from being degraded unnecessarily, and/or prevent the noise generated by the rotation of the fan. In other words, the temperature controlling apparatus 10, by providing the fan rotation speed in response to the surrounding conditions, the heated LSI and the like can be cooled without generating the noise produced by the rotation of the fan that makes the user uncomfortable. As a result, it is possible to highly maintain the value of the operating performance of various types of processing.

For example, the temperature controlling apparatus 10 correspondingly stores the surrounding noise, the fan noise, and the fan rotation speed in the first storage unit, and correspondingly stores the temperature, the fan rotation speed, and the operating clock frequency in the second storage unit. The temperature controlling apparatus 10 acquires the fan noise that corresponds to the measured surrounding noise from the first storage unit. The temperature controlling apparatus 10 then acquires the fan rotation speed that corresponds to the acquired fan noise from the first storage unit, and determines the acquired fan rotation speed as a fan rotation speed that corresponds to the measured surrounding noise. The temperature controlling apparatus 10 measures the temperature of the LSI, acquires the temperature that corresponds to the determined fan rotation speed, and compares the acquired temperature and the measured temperature. If the measured temperature is equal to or more than the acquired temperature, the temperature controlling apparatus 10 acquires the operating clock frequency that corresponds to the acquired temperature from the second storage unit, and sets in the LSI. If the measured temperature is less than the acquired temperature, the temperature controlling apparatus 10 acquires the fan rotation speed and the operating clock frequency that correspond to the measured temperature from the second storage unit, determines the fan rotation speed as a new fan rotation speed, and sets the acquired operating clock frequency in the LSI. As a result, it is possible to prevent the processing performance of the LSI to be connected from being degraded unnecessarily, and/or prevent noise generated by the rotation of the fan.

In the first embodiment, the fan rotation speed that corresponds to the acquired fan noise was determined, by acquiring the fan noise smaller than the surrounding noise. However, the present invention is not limited to this, and the fan rotation speed that corresponds to the acquired fan noise can be determined, by acquiring a fan noise smaller than the surrounding noise of each frequency component that is the pitch of the surrounding noise.

In the following second example, a temperature control process performed by the temperature controlling apparatus 10 according to a second embodiment of the present invention will be explained with reference to FIG. 8. FIG. 8 is a schematic diagram of an example of the surrounding noise/fan noise table 21 according to the second embodiment. Because the configuration, a part of functions, and the like of the temperature controlling apparatus 10 according to the second embodiment are the same as those in the first embodiment, the descriptions thereof are omitted. A process of determining a fan rotation speed using the surrounding noise/fan noise table 21 and the fan/LSI operation determining unit 34 different from that of the first embodiment will now be explained.

Temperature Control Process according to Second Embodiment

The surrounding noise/fan noise table 21 correspondingly stores therein a surrounding noise of each frequency component that indicates the pitch of the surrounding noise that shows the volume of noise in the surrounding environment of the temperature controlling apparatus 10, and a fan noise that indicates the volume of noise generated by the rotation of the fan determined based on the surrounding noise.

For example, as shown in FIG. 8, the surrounding noise/fan noise table 21 correspondingly stores therein a surrounding noise of each frequency component such as "1 kilohertz: 35 dBA", "3 kilohertz: 39 dBA", "5 kilohertz: 30 dBA", "10 kilohertz: 25 dBA", and "30 kilohertz: 23 dBA" that indicates the pitch of the surrounding noise that shows the volume of noise in the surrounding environment of the temperature controlling apparatus 10. The temperature controlling apparatus 10 also correspondingly stores therein a fan noise such as "1 kilohertz: 24 dBA", "3 kilohertz: 29 dBA", "5 kilohertz: 20 dBA", "10 kilohertz: 14 dBA", and "30 kilohertz: 13 dBA" that indicates the volume of noise generated by the rotation of the fan determined based on the surrounding noise. The fan noise determined in correspondence with each frequency component of the surrounding noise is smaller than the surrounding noise so as not to make the user uncomfortable, as the first embodiment.

The fan/LSI operation determining unit 34 acquires a fan noise that corresponds to each frequency component of the surrounding noise notified by the surrounding noise measuring unit 31, from the surrounding noise/fan noise table 21, and acquires a fan rotation speed that corresponds to the acquired fan noise, from the fan rotation/fan noise table 22. Accordingly, the fan/LSI operation determining unit 34 determines the acquired fan rotation speed as a fan rotation speed that corresponds to each frequency component of the surrounding noise notified by the surrounding noise measuring unit 31.

Explaining more specifically, the fan/LSI operation determining unit 34 acquires a fan noise of "14 dBA" that corresponds to a frequency component of "10 kilohertz" of a surrounding noise of "25 dBA" notified by the surrounding noise measuring unit 31, from the surrounding noise/fan noise table 21. The fan/LSI operation determining unit 34 then acquires a fan duty cycle at "8%" that indicates a ratio of the fan rotation speed that corresponds to the acquired fan noise of "14 dBA", from the fan rotation/fan noise table 22. Subsequently, the fan/LSI operation determining unit 34 determines the acquired fan duty cycle at "8%" as a fan rotation speed that corresponds to the frequency component of "10 kilohertz" of the surrounding noise of "25 dBA" notified by the surrounding noise measuring unit 31.

The temperature controlling apparatus 10 not only determines the fan rotation speed that corresponds to the acquired fan noise, by acquiring the fan noise smaller than the surrounding noise of each frequency component, which is the pitch of the surrounding noise, but also can determine the fan rotation speed by comparing a total value of the surrounding noise and the fan noise, with a predetermined threshold, so as the total value does not exceed the predetermined threshold.

For example, the temperature controlling apparatus 10, while a frequency component that makes the user uncomfortable is equal to or more than "10 kilohertz", if the total value of a surrounding noise of "25 dBA" and a fan noise of "14 dBA" of the "10 kilohertz" is equal to or more than a predetermined threshold of "35 dBA", lowers the adjustable fan noise to "10 dBA", acquires a fan duty cycle at "5%" that corresponds to the fan noise of "10 dBA" from the fan rotation/fan noise table 22, and determines a fan duty cycle that indicates a ratio of the fan rotation speed.

Advantages of Second Embodiment

In this manner, according to the second embodiment, the temperature controlling apparatus 10 determines the fan rotation speed that takes into account not only the volume of sound, but also the rise and fall of sound. Accordingly, it is possible to further accurately determine the fan rotation speed in response to the surrounding noise. The temperature controlling apparatus 10 also determines the fan rotation speed that takes into account the noise equal to or more than the pitch of a predetermined sound that makes the user uncomfortable. Accordingly, it is possible to further accurately determine the fan rotation speed in response to the surrounding noise.

In the second embodiment, the fan rotation speed that corresponds to the acquired fan noise is determined, by acquiring the fan noise smaller than the surrounding noise of each frequency component, which is the pitch of the surrounding noise. However, the present invention is not limited to this, and the fan rotation speed can also be determined by using a masking effect of sound.

In the following third embodiment, a temperature control process performed by the temperature controlling apparatus 10 according to a third embodiment of the present invention will be explained with reference to FIG. 9. FIG. 9 is a schematic diagram of an example of the surrounding noise/fan noise table 21 according to the third embodiment. Because the configuration, a part of functions, and the like of the temperature controlling apparatus 10 according to the third embodiment are the same as those in the first embodiment and the second embodiment, the descriptions thereof are omitted. A process of determining a fan rotation speed using the surrounding noise/fan noise table 21 and the fan/LSI operation determining unit 34 different from that of the first embodiment or the second embodiment will now be explained.

Temperature Control Process Using Masking Effect According to Third Embodiment

The surrounding noise/fan noise table 21 stores therein a surrounding noise of each frequency component that indicates the pitch of the surrounding noise that shows the volume of noise in the surrounding environment of the temperature controlling apparatus 10. For example, as shown in FIG. 9, the surrounding noise/fan noise table 21 correspondingly stores therein a surrounding noise such as "1 kilohertz: 35 dBA", "3 kilohertz: 39 dBA", "5 kilohertz: 30 dBA", "10 kilohertz: 25 dBA", and "30 kilohertz: 23 dBA" with respect to each frequency component.

The fan/LSI operation determining unit 34 acquires a high level frequency component in the surrounding noise, by using a masking effect, and determines a fan rotation speed that is a fan noise with a frequency slightly higher than that of the frequency component. Explaining more specifically, the fan/LSI operation determining unit 34 determines a fan duty cycle at "37%" that corresponds to a fan noise of "4 kilohertz: 27 dBA" that has the frequency slightly higher than the "3 kilohertz: 39 dBA" that is the highest level in the surrounding noise, by using the masking effect. The masking effect is a characteristic of the human ear that the sound with a frequency slightly higher than a certain frequency is indiscernible.

Advantages of Third Embodiment

In this manner, according to the third embodiment, the temperature controlling apparatus 10 determines the fan rotation speed by using the masking effect, which is a characteristic of the human ear. Accordingly, it is possible to more accurately determine the fan rotation speed in response to the surrounding noise.

Thus far, the embodiments of the present invention have been explained. However, the present invention is not limited to these embodiments, but may be modified in various forms. Consequently, other embodiments with different (1) configurations of the temperature controlling apparatus and (2) computer programs will be explained.

a. Configuration of Temperature Controlling Apparatus

The information (such as items and numerals stored in the "surrounding noise/fan noise table 21", the "fan rotation/fan noise table 22", the "temperature/fan rotation table 23", and the "operating clock frequency/temperature table 24", as shown in FIG. 2) including the process procedure, the control procedure, specific names, and various kinds of data and parameter shown in the specification or in the drawings can be optionally changed, unless otherwise specified.

The respective constituents of the illustrated apparatus are functionally conceptual, and need not necessarily be physically configured as illustrated. In other words, the specific mode of dispersion and integration of each apparatus is not limited to the ones shown in the drawings, and all or a part thereof can be functionally or physically dispersed or integrated in an optional unit, according to the various kinds of load and the status of use. These are enabled, for example, by dispersing the fan/LSI operation determining unit 34 into a fan rotation speed determining unit that determines a rotation speed of the fan, a temperature comparing unit that compares the measured temperature and the temperature acquired from the table, and an operating clock frequency determining unit that determines an operating clock frequency and controls the LSI. All or an optional part of the respective processing functions carried out in each apparatus are realized by a CPU and a computer program analyzed and executed by the CPU, or may be realized as hardware by the wired logic.

(2) Computer Program

Figure 10:
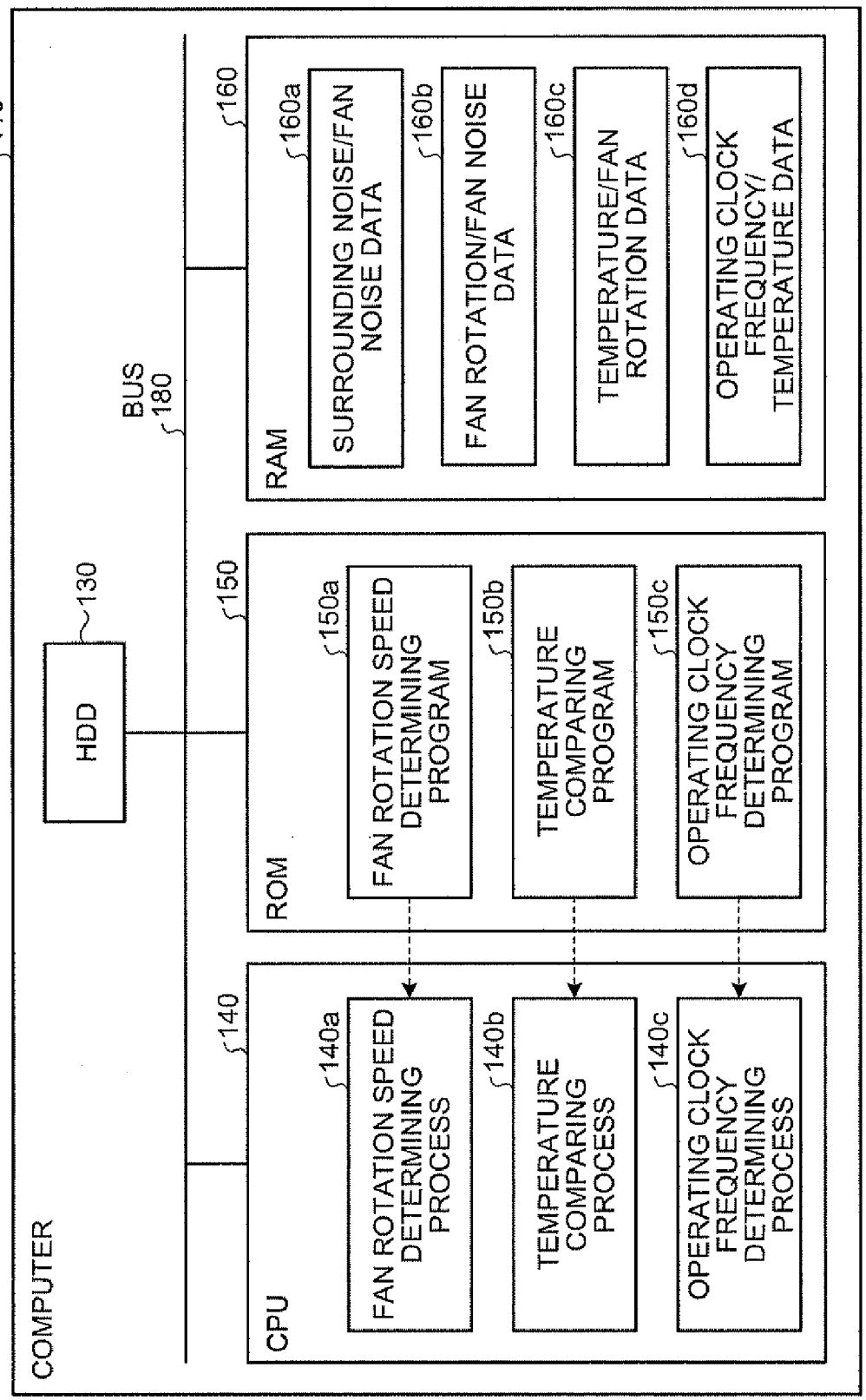
FIG. 10 is a schematic for explaining a computer that executes a temperature control program.
Figure 11:
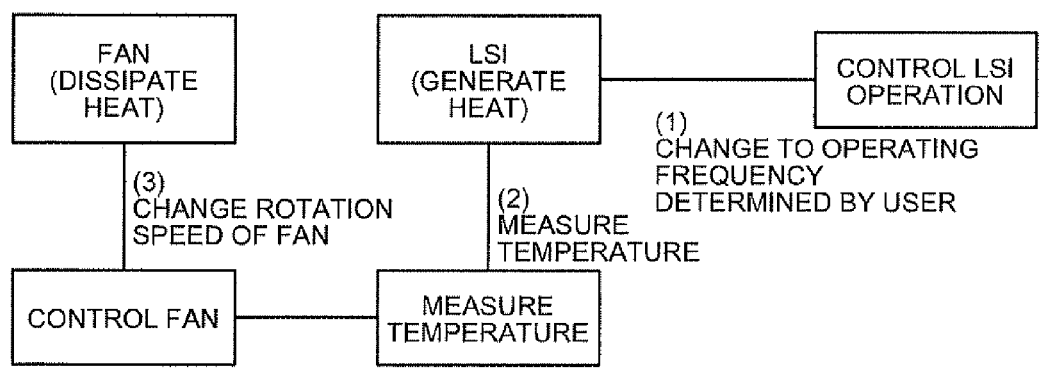
FIG. 11 is a schematic for explaining a process performed by a temperature controlling apparatus according to a related art.

In the embodiments, various types of processing were realized by the hardware logic. However, the present invention is not limited to this, and the various types of processing may be realized by executing a computer program prepared in advance by a computer. An example of a computer that executes a temperature control program that has the same functions as those of the temperature controlling apparatus shown in the embodiments will now be explained, with reference to FIG. 10. FIG. 10 is a schematic for explaining the computer that executes the temperature control program.

As shown in FIG. 10, a computer 110 as the temperature controlling apparatus is configured by connecting a hard disk drive (HDD) 130, a CPU 140, a read-only memory (ROM) 150, and a random access memory (RAM) 160 via a bus 180.

The ROM 150 stores therein in advance temperature control programs that exercise the same functions as the temperature controlling apparatus 10 shown in the first embodiment. In other words, the ROM 150 stores therein a fan rotation speed determining program 150a, a temperature comparing program 150b, and an operating clock frequency determining program 150c, as shown in FIG. 10. The fan rotation speed determining program 150a, the temperature comparing program 150b, and the operating clock frequency determining program 150c may be suitably integrated or dispersed as each constituent of the temperature controlling apparatus 10 shown in FIG. 2.

Because the CPU 140 reads and executes the fan rotation speed determining program 150a, the temperature comparing program 150b, and the operating clock frequency determining program 150c from the ROM 150, as shown in FIG. 10, the fan rotation speed determining program 150a, the temperature comparing program 150b, and the operating clock frequency determining program 150c function as a fan rotation speed determining process 140a, a temperature comparing process 140b, and an operating clock frequency determining process 140c. The fan rotation speed determining process 140a, the temperature comparing process 140b, and the operating clock frequency determining process 140*c* correspond to the surrounding noise measuring unit 31, the temperature measuring unit 32, the fan controlling unit 33, and the fan/LSI operation controlling unit 34, shown in FIG. 2.

The CPU 140 executes the temperature control program based on surrounding noise/fan noise data 160*a*, fan rotation/fan noise data 160*b*, temperature/fan rotation data 160*c*, and operating clock frequency/temperature data 160*d*, stored in the RAM 160.

Each of the fan rotation speed determining program 150*a*, the temperature comparing program 150*b*, and the operating clock frequency determining program 150*c* does not need to be stored in the ROM 150 from the beginning, but for example, may be stored in a "portable physical media" such as a flexible disk (FD), a compact disk read only memory (CD-ROM), a digital versatile disk (DVD), a magnetooptical disk, and an integrated circuit (IC) card inserted in the computer 110, in a "fixed physical media" such as a HDD provided inside and outside of the computer 110, or in the "other computer (or server)" connected to the computer 110 via a public line, the Internet, a local area network (LAN), a wide area network (WAN), and the like, and the computer 110 can read and execute each of the computer programs therefrom.

According to the embodiments of the temperature controlling apparatus of the present invention, it is possible to advantageously prevent the processing performance of the connected LSI from being degraded unnecessarily, and/or advantageously prevent the noise generation by the rotation of the fan.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A temperature controlling apparatus that controls a fan rotation speed of a fan rotated to prevent a temperature increase at a surface of a casing that is a controlled object that undergoes various types of processing, and an operating clock frequency that indicates a value of operating performance required for operating the controlled object that undergoes the various types of processing, the temperature controlling apparatus comprising:

a first storage unit that correspondingly stores therein a surrounding noise that indicates volume of noise in a surrounding environment of the temperature controlling apparatus, a fan noise that indicates volume of noise generated by a rotation of the fan determined based on the surrounding noise, and a fan rotation speed that indicates a rotation speed of the fan based on the fan noise;

a second storage unit that correspondingly stores therein a first temperature that is a temperature in one of the casing and a surrounding or both of the temperature controlling apparatus, a fan rotation speed that indicates the rotation speed of the fan required for dissipating heat generated by an increase in the first temperature, and the operating clock frequency that indicates the value of the operating performance;

a fan rotation speed determining unit that measures the surrounding noise at a predetermined period of time, acquires a fan noise that corresponds to the measured surrounding noise from the first storage unit, acquires a fan rotation speed that corresponds to the acquired fan noise from the first storage unit, and determines the acquired fan rotation speed as a fan rotation speed based on the measured surrounding noise;

a temperature comparing unit that measures, if the fan rotation speed determining unit determines the fan rotation speed, the first temperature, acquires a second temperature that is a temperature that corresponds to the fan rotation speed determined by the fan rotation speed determining unit from the second storage unit, and compares the measured first temperature and the acquired second temperature; and an operating clock frequency determining unit, if the temperature comparing unit determines that the first temperature is equal to or more than the second temperature, that acquires an operating clock frequency that corresponds to the acquired second temperature from the second storage unit, controls the controlled object by using the acquired operating clock frequency, and controls the fan by using the fan rotation speed determined by the fan rotation speed determining unit, and if the temperature comparing unit determines that the first temperature is less than the second temperature, that acquires an operating clock frequency and a fan rotation speed that correspond to the measured first temperature from the second storage unit, controls the fan by using the acquired fan rotation speed, and controls the controlled object by using the acquired operating clock frequency.

2. The temperature controlling apparatus according to claim 1, wherein the first storage unit further correspondingly stores therein each frequency component that indicates pitch of the surrounding noise, and the fan rotation speed determining unit measures the surrounding noise and the frequency component at the predetermined period of time, acquires a fan noise that corresponds to the measured surrounding noise and each frequency component from the first storage unit, acquires a fan rotation speed that corresponds to the acquired fan noise from the first storage unit, and determines the acquired fan rotation speed as a fan rotation speed based on each frequency component of the measured surrounding noise.

3. The temperature controlling apparatus according to claim 2, wherein the fan rotation speed determining unit measures the surrounding noise and a frequency component at the predetermined period of time, acquires a fan noise that corresponds to the measured surrounding noise and the frequency component at or more than a predetermined value from the first storage unit, and determines a fan rotation speed so that a total value of the measured surrounding noise and the acquired fan noise does not exceed a predetermined threshold.

4. A computer-readable recording medium that stores therein a computer program for controlling a fan rotation speed of a fan rotated to prevent a temperature increase at a surface of a casing that is a controlled object that undergoes various types of processing, and an operating clock frequency that indicates a value of operating performance required for operating the controlled object, the computer program causing a computer which works as a temperature controlling apparatus to execute:

firstly storing correspondingly a surrounding noise that indicates volume of noise in a surrounding environment of the temperature controlling apparatus, a fan noise that indicates volume of noise generated by a rotation of the fan determined based on the surrounding noise, and a fan rotation speed that indicates a rotation speed of the fan based on the fan noise;

secondly storing correspondingly a first temperature that is a temperature in one of the casing and a surrounding or both of the temperature controlling apparatus, a fan rotation speed that indicates the rotation speed of the fan required for dissipating heat generated by an increase in the first temperature, and the operating clock frequency that indicates the value of the operating performance;

determining the fan rotation speed by measuring the surrounding noise at a predetermined period of time, acquiring a fan noise that corresponds to the measured surrounding noise from information stored at the firstly storing, acquiring a fan rotation speed that corresponds to the acquired fan noise from the information stored at the firstly storing, and determining the acquired fan rotation speed as the fan rotation speed based on the measured surrounding noise;

comparing the first temperature and a second temperature by measuring, if the fan rotation speed is determined at the determining, the first temperature, acquiring the second temperature that is a temperature that corresponds to the fan rotation speed determined at the determining from information stored at the secondly storing, and comparing the measured first temperature and the acquired second temperature; and determining the operating clock frequency, if the first temperature is determined to be equal to or more than the second temperature at the comparing, by acquiring an operating clock frequency that corresponds to the acquired second temperature from information stored at the secondly storing, controlling the controlled object by using the acquired operating clock frequency, and controlling the fan by using the fan rotation speed determined at the determining, and if the first temperature is determined to be less than the second temperature at the comparing, by acquiring an operating clock frequency and a fan rotation speed that correspond to the measured first temperature from the information stored at the secondly storing, controlling the fan by using the acquired fan rotation speed, and controlling the controlled object by using the acquired operating clock frequency.

* * * * *